Mar. 27, 1923.
W. DAVIS.
CONTROLLING MECHANISM FOR ELECTRIC MOTORS.
FILED JUNE 12, 1922.
1,449,500.
2 SHEETS—SHEET 2.
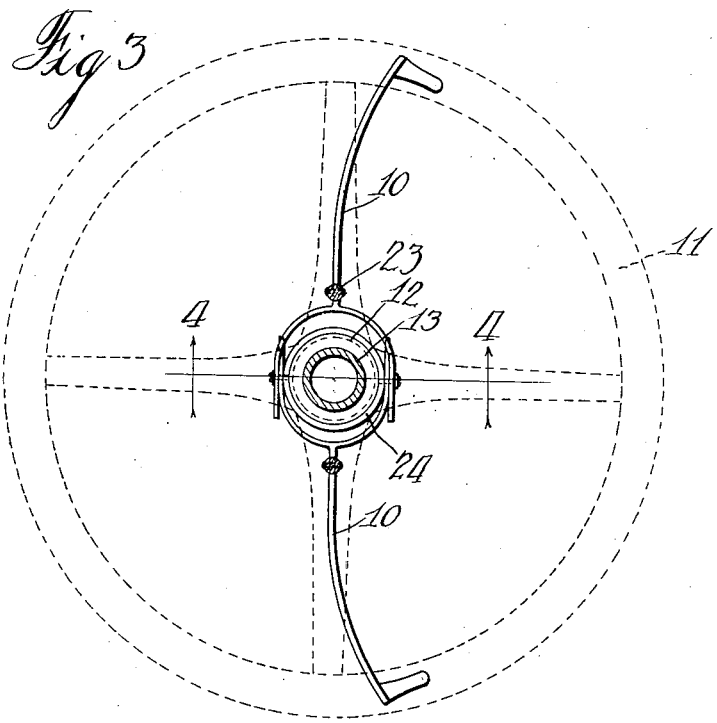
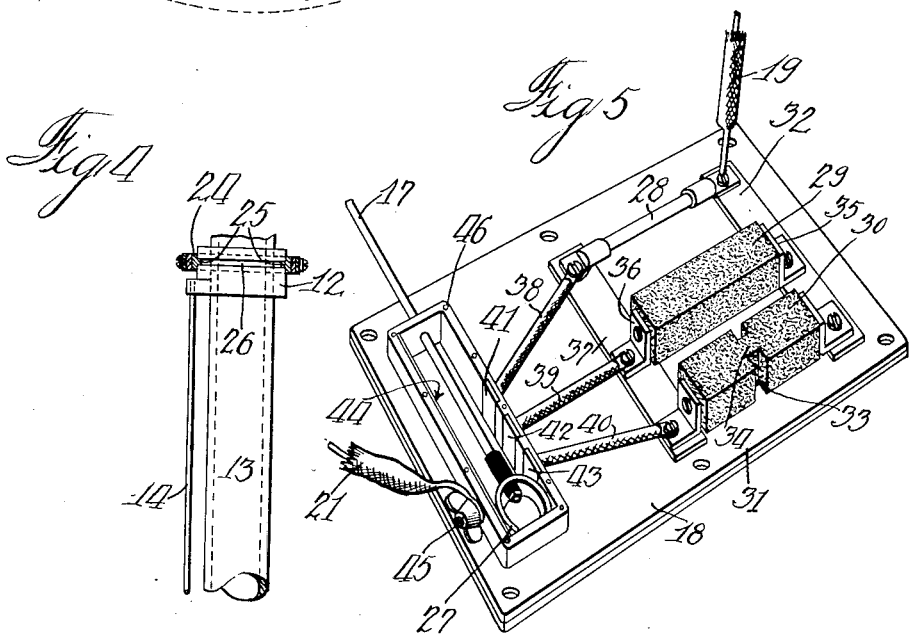
Witness
Davl S. Magnusson.
Inventor
William Davis.
By Chas. C. Tillman
Atty.

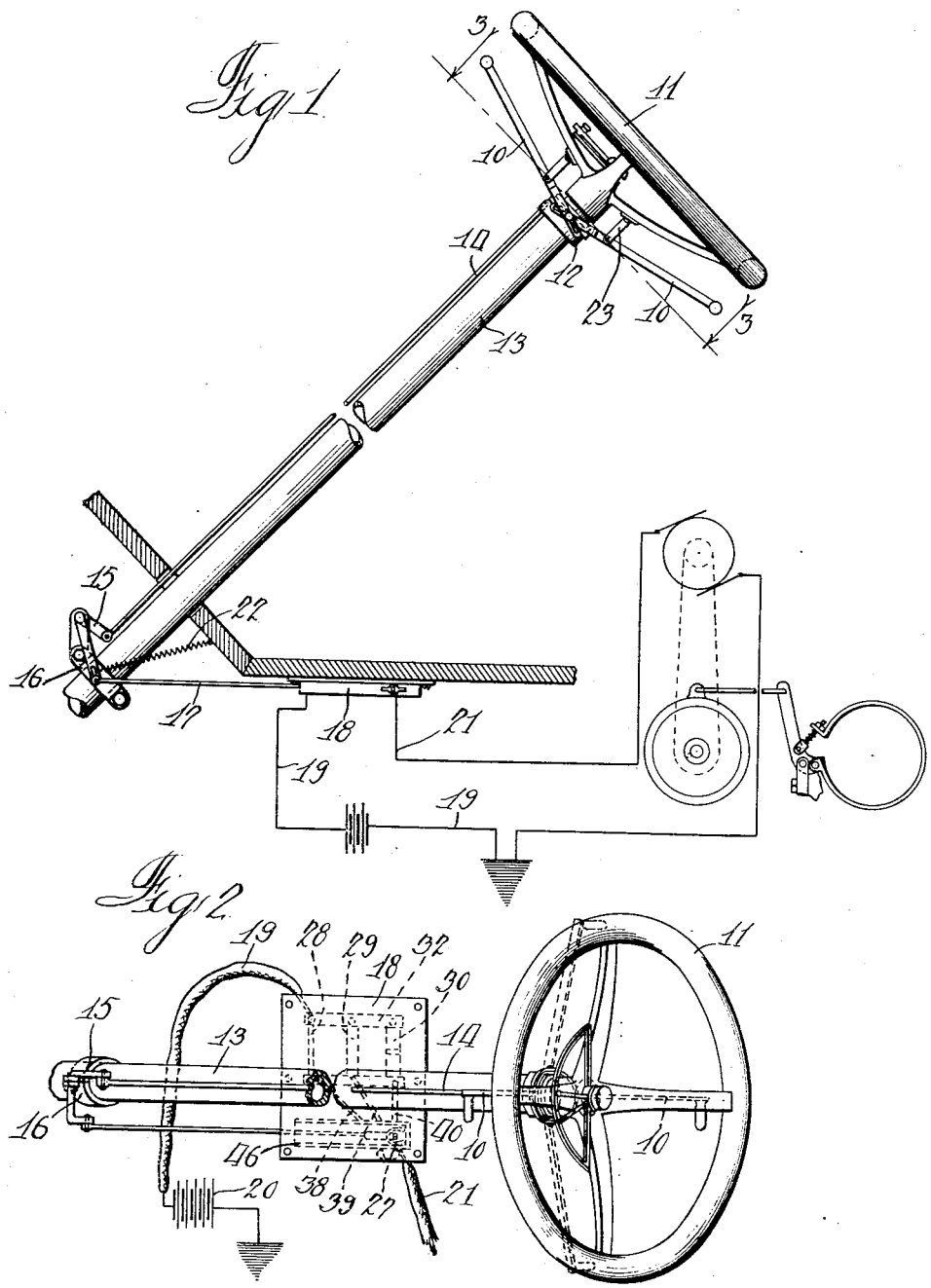

Patented Mar. 27, 1923.

1,449,500

UNITED STATES PATENT OFFICE.

WILLIAM DAVIS, OF CHICAGO, ILLINOIS.

CONTROLLING MECHANISM FOR ELECTRIC MOTORS.

Application filed June 12, 1922. Serial No. 567,872.

*To all whom it may concern:*

Be it known that I, WILLIAM DAVIS, a citizen of the United States, residing at Chicago, in the county of Cook and State of Illinois, have invented certain new and useful Improvements in a Controlling Mechanism for Electric Motors, of which the following is a specification.

The invention relates to controlling mechanisms for electric motors whereby said motor may be conveniently controlled and operated at various speeds depending upon the power required to perform or accomplish the desired work.

The invention has among its various objects, an arrangement whereby a motor controlled brake mechanism may be actuated so as to apply a variable force to the brakes so that the mechanism controlled by the brakes may be operated at various speeds or brought to a rest.

It is a further object of the invention to provide a variable resistance between the motor for actuating the brake and the source of current for driving the motor, and in addition to provide a means which is arranged remote to the variable resistance for actuating it, so as to accomplish the various advantages hereinbefore referred to.

It is a further object to produce a mechanism applicable for association with a vehicle such as an automobile and to arrange the actuating mechanism for the variable resistance at a convenient point from which it may be operated.

The invention is particularly applicable for association with a mechanism such as shown and described in my application, Serial No. 537,849 filed February 20, 1922. in which is illustrated a motor actuated brake mechanism.

The invention contemplates the use of a lever mechanism which is carried by the steering wheel of an automobile. This lever mechanism is associated with a sliding collar mounted to slide with relation to the outer casing of the steering post.

A link connection is provided between the sliding collar and a suitable bell crank lever which is also mounted upon the steering post.

Another link connection is made between the bell crank lever and the variable resistance, thus as the lever mechanism, carried by the steering wheel and post, is actuated this variable resistance will also be actuated causing the motor (not shown) which is in circuit with the resistance to be actuated at various speeds, and as the motor is connected to the brake mechanism (not shown) a variable resisting force will be applied to the brake mechanism which will permit the operator of the vehicle to release or apply the brakes so as to bring it to a stop or cause a variable resistance to be applied to reduce the speed of the vehicle or release it when this is found necessary or desirable.

The invention will be explained and more readily understood when read in conjunction with the accompanying drawings, which illustrate one embodiment of the invention, it being obvious that changes and modifications may be resorted to without departing from the spirit of the appended claims forming a part hereof.

In the drawings, Figure 1 illustrates a vehicle steering wheel mechanism and post having certain lever controls employed in the structure applied thereto, and showing the connections between said lever control and the variable resistance employed in the structure.

Figure 2 is a plan view of the structure shown in Figure 1.

Figure 3 is a section taken on line 3—3 of Figure 1.

Figure 4 is a fragmentary view of a portion of the steering post illustrating in detail the connection provided between the lever mechanism and the means provided upon the post for actuating the variable resistance.

Figure 5 is a perspective view of the variable resistance hereinbefore referred to.

The structure illustrated in the drawings for accomplishing the invention contemplates a lever mechanism generally designated 10 which is carried by the steering wheel 11 of an automobile, the slidable collar 12 which is slidable with relation to the outer casing of the steering post generally designated 13, a rod 14 which has one end thereof connected to the collar 12 and has the opposite end attached to one end of the bell crank lever 15, which is mounted by means of the bracket 16 upon the steering post 13.

A connecting rod 17 is employed which has its opposite ends respectively connected with the other arm of the bell crank lever 15, and a variable resistance generally designated 18.

As illustrated in Figure 2 this variable resistance has a conductor 19 which leads to a battery 20, the latter of which is grounded by being connected with any suitable portion of the vehicle frame.

The conductor 21 is also employed which leads to the motor (not shown) and is also grounded in a manner similar to the battery 20.

A coiled spring 22 is connected with the bell crank lever 15 and is employed to maintain the parts in the relative position illustrated in Figure 1.

From the foregoing description, it is evident that upon the manipulation of either of the levers 10, the connecting rod 14 will be actuated through the medium of the collar 12 which is connected to the levers 10.

The motion of the connecting rod 14 will be transmitted to the bell crank lever 15, which actuates the variable resistance generally designated 18 which as before stated is connected to the bell crank lever 15 by means of the connecting rod 17.

The levers 10—10 are secured to the steering wheel 11 by means of the brackets 23 to which they are pivotally secured and by virtue of the connection between these levers 10 and the steering wheel 11 the levers will be rotated with the steering wheel 11 and therefore will at all times be positioned for ready actuation by the driver of the vehicle.

The adjacent ends of the levers 10 are forked and slotted and are connected to the collar 24 having the pins or projections 25 which extend into an annular recess 26 provided in the slidable collar 12 mounted upon the steering post 13.

From the foregoing explanation it is evident that when either of the levers 10 is actuated the collar 12 will be moved longitudinally of the steering post.

It is further manifest that by the provision of the annular recess 26 in the slidable collar 12 that the levers 10—10 may be rotated with the steering wheel with respect to the collar 12 and the steering post and by virtue of the connections between the slidable collar 12 and the variable resistance 18 the latter will be actuated.

The elements entering into the structure of this variable resistance are clearly shown in Figure 5.

This variable resistance includes the electric switch 27 which is connected to an end of the connecting rod 17 and the variable resistance elements 28, 29 and 30 all of which are mounted upon the panel 31 which may be of any suitable material such as asbestos, fibre, or some other suitable insulating material.

The resistance elements 28, 29 and 30 offer a variable resistance to the current as the current passes from the conductor 19. The element 28 offering the least resistance, the element 29 a relatively greater resistance and the element 30 the greatest resistance. These elements 28, 29 and 30 are all in electrical contact with a conductor 32 which is also connected to the conductor 19 leading from the battery 20. The resistance elements 29 and 30 are preferably constructed of carbon blocks; the element 30 being cut away as indicated at 33 so as to provide the relatively small portion 34 which will add to the resistance of the current passing through this element, and will therefore offer a greater resistance to the current that is offered by the element 29 or the element 28. These resistance elements 28, 29 and 30 have secured at their opposite ends suitably shaped brackets 35 and 36 whereby these elements are secured to the conductor 32 and the insulating strip 37.

The conductors 38, 39 and 40 respectively lead from the resistance elements 28, 29 and 30 and have their opposite ends connected to the contact elements 41, 42, and 43 the latter of which cooperate with the switch element 27 connected to the operating rod 17.

The switch element 27 is preferably formed of any suitable flexible material, and is U shaped as illustrated in Figure 5, and normally assumes a neutral position from which it is moved into contact with one or the other of the contact elements 41, 42 and 43.

The separated arms of the U respectively engage the contact elements 41, 42 and 43 when positioned to permit of this and also contact with the conductor 44 which is connected to the conductor 21 and the motor (not shown) by means of the thumb screw 45. The switch 27 is confined in a rectangular shaped guide-way 46 which is constructed of some suitable insulating material, it being, of course, understood that the entire mechanism illustrated in Figure 5 may be encased to protect it from various substances which it may be subjected to, when secured to a vehicle.

From the foregoing description of the mechanism, it is evident that an arrangement is provided for controlling an electric motor and which is particularly adaptable for association with the steering mechanism of a vehicle permitting the means for actuating the controlling mechanism to be positioned so that it is readily accessible for use by the driver of the vehicle with either or both of his hands, when applied to the steering wheel, no matter in what position said wheel may be located or turned.

What I claim is:

1. In a device of the character described the combination of a variable resistance and means arranged remote from said resistance for controlling said resistance whereby the speed of a motor may be varied, said means including a reciprocable element and an element which is rotatable independently of the reciprocable element.

2. In a device of the character described the combination of a variable resistance connected with a motor for varying the speed of the motor, said resistance including a switch, means for actuating said switch, said means including a reciprocable element and an element which is rotatable independently of the reciprocable element.

3. In a device of the character described, the combination of a variable resistance connected with a motor for varying the speed of the motor, said resistance including a switch, means for actuating said switch, said means including an element which is reciprocable, a rotatable lever for actuating said element and a connection between said reciprocable element and said lever whereby said reciprocable element may be actuated by said lever when said lever is arranged in any of its various positions of rotation.

4. In a device of the character described, the combination of a variable resistance connected with a motor for varying the speed of the motor and constructed to be associated with the steering mechanism having a steering wheel, a switch, means for actuating the switch, said means being connected to and rotatable with the wheel of the steering mechanism.

5. In a device of the class described, the combination of a variable resistance connected with a motor for varying the speed of the motor and constructed to be associated with the steering mechanism of a vehicle, a switch, means for actuating the switch said means being associated with the steering mechanism and including means which is connected to rotate with said mechanism without affecting the means for actuating the switch.

6. In a device of the class described, the combination of a variable resistance connected with a motor for varying the speed of the motor and constructed to be associated with the steering mechanism of a vehicle, a switch, means for actuating the switch said means being associated with the steering mechanism and including means which is rotatable with said steering mechanism and reciprocable with respect to said steering mechanism.

7. In a device of the class described, the combination of a variable resistance connected with a motor for varying the speed of the motor and constructed to be associated with the steering mechanism of a vehicle, a switch, means for actuating the switch, said means being associated with the steering mechanism, and being reciprocable with respect to the steering mechanism.

8. In a device of the class described, the combination of a variable resistance connected with a motor for varying the speed of the motor and constructed to be associated with the steering mechanism of a vehicle, a switch, means for actuating the switch, said means being associated with the steering mechanism and being reciprocable with respect to said steering mechanism and a lever for actuating said means of said switch.

WILLIAM DAVIS.